April 25, 1933.  M. STANDISH  1,905,009
TRUCK BODY
Original Filed Aug. 18, 1928  2 Sheets-Sheet 2
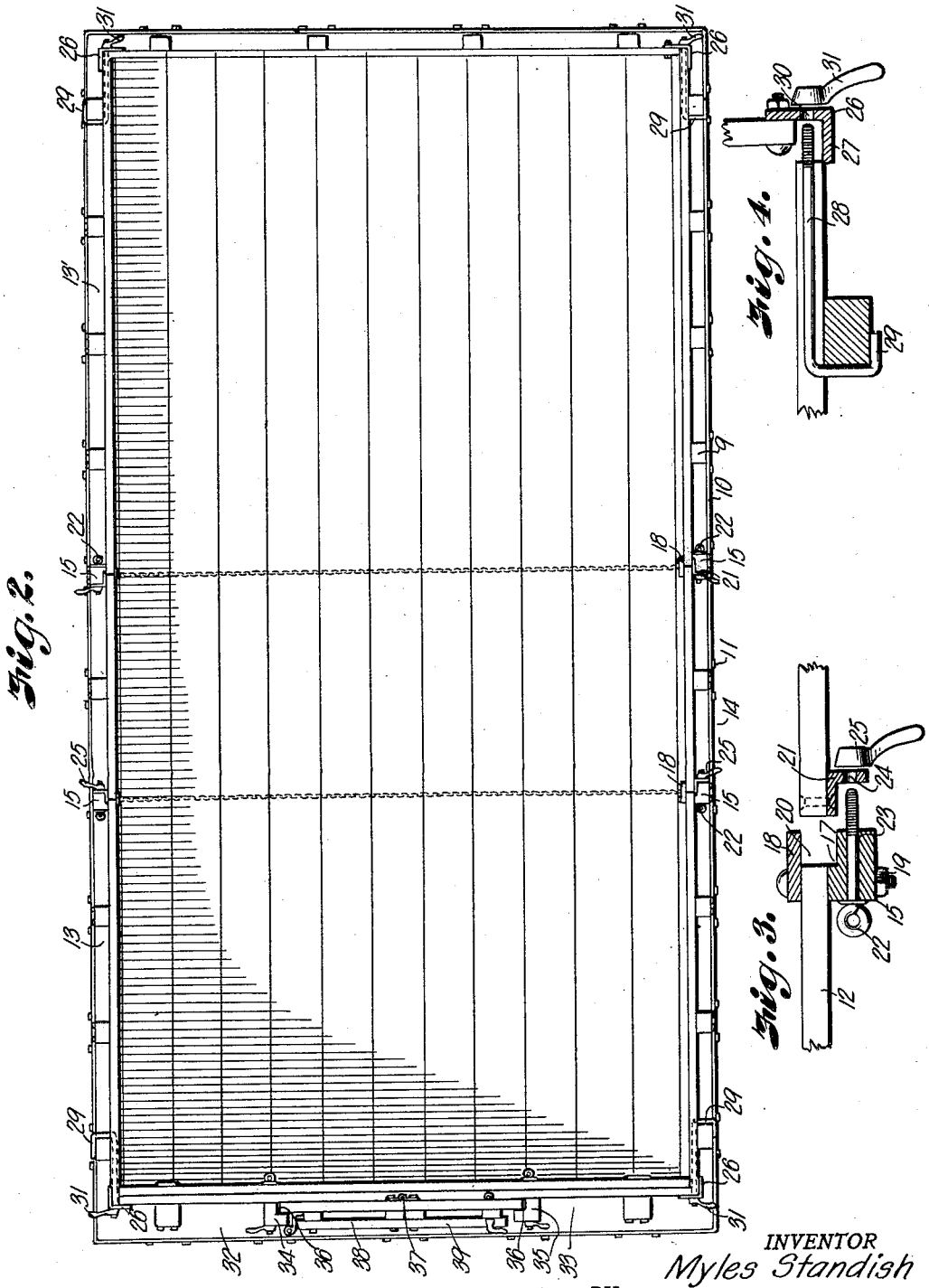
INVENTOR
Myles Standish
BY
ATTORNEY Patented Apr. 25, 1933

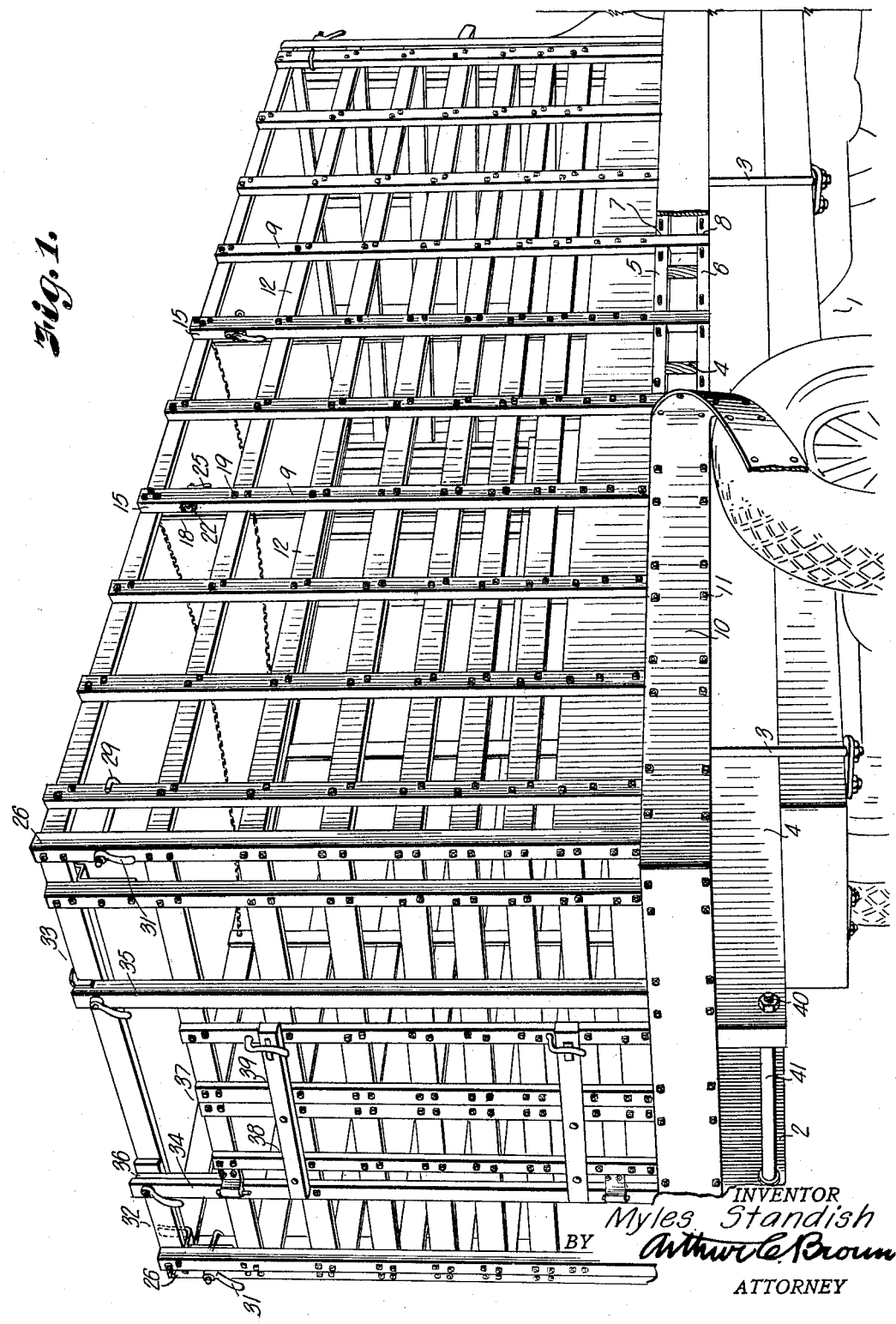

1,905,009

UNITED STATES PATENT OFFICE

MYLES STANDISH, OF OMAHA, NEBRASKA

TRUCK BODY

Original application filed August 18, 1928, Serial No. 300,725. Divided and this application filed April 28, 1930. Serial No. 447,894.

My invention relates to truck bodies and more particularly to bodies having base frames adapted to support stakes, the principal objects of the invention being to adapt a stake body to a variety of uses, to connect sections of a body in such a manner that they may be easily assembled and separated, to adapt body sections for handling by one person so that the body may be assembled and disassembled with relative ease, to securely attach separable body sections adapted for easy removal and replacement, and to provide a variety of means of access to the body.

This application is a division from my co-pending application, Serial No. 300,725.

In accomplishing these and other objects of the invention, I have provided improved details of structure, the preferred forms of which are illustrated in the accompanying drawings, wherein:

Fig. 1 is a perspective view of a truck body embodying my invention, mounted on a chassis, a retaining band being partly displaced to disclose the method of mounting side stakes in the base frame.

Fig. 2 is a plan view of the body illustrating the separable connection of body sections.

Fig. 3 is a section of adjacent portions of body sections and means for connecting them.

Fig. 4 is a detail sectional view of elements and connecting corners of the body, the corner members being shown fragmentarily and in spaced relation.

Referring in detail to the drawings:

1 designates the frame of a vehicle illustrated as a motor truck adapted for commercial freighting on which are mounted longitudinal sills 2 secured to the frame by U-bolts 3. Supported crosswise by the sills are cross sills or joists 4 having ends notched at the top and bottom to receive upper and lower ribbon boards 5 and 6 having vertically aligned grooves 7 and 8 in their outer edges to receive the lower ends of side stakes 9.

The vertical stakes are retained in vertical position by a relatively wide metal band 10 preferably formed of long sections and which may be continuous, the band being arranged around the body to form a peripheral skirt or reinforcing member and being fixed to the ribbon boards and their joists by bolts 11 to retain and rigidly support the stakes.

A metal band thus cooperates with the grooved ribbon boards to form pockets to receive the stakes. The band further tends to support the ends of the intermediate cross joints and the ribbon boards, against deflection by loads exerting pressure on the outer longitudinal margins of the middle portion of the truck where joist stiffening members are lacking.

The band thus serves as a truss for stiffening the joists and ribbon boards and distributing the load along the sills.

The stake structure of the body is preferably formed in sections, comprising a plurality of stakes joined by parallel bars 12 to form rack sections, and each side of the body comprises a plurality of sections, such as 13 and 13', connected by a side gate section 14 slidable between the two sections for opening and removal of the gate section independently of the adjacent sections.

Side stakes 15 of the gate section extend laterally from the ends of side section bars 12, and the extending portions are provided with vertical grooves 17. Plates 18 are fixed to the side bars opposite to and in registry with said stakes 15 by bolts 19 to provide channels or sockets 20, to receive the adjacent vertical edges of a gate section. Supporting angle flanges 21 are secured to the ends of the bars of the gate sections, the channels 20 being adapted to receive the bar ends together with the supporting flanges. Eye bolts 22 extend through apertures 23 of the side section stakes and through apertures 24 in the angle flanges for engagement with wing nuts 25 for securing the gate to the adjacent sections.

Angles 26 are secured to ends of bars of end sections having flanges 27 spaced from the bar ends for receiving the ends of bars of side sections, the corners of the stake structure being connected by bolts 28 having hooks 29 engageable with stakes adjacent the ends of the side sections. The screw threaded ends of the bolts are projectable through openings 30 in the angles and held in engagement therewith by wing nuts 31.

The rear end of the body comprises sections 32 and 33 connected with the sides as described, and spaced to constitute a gate opening, the opposite section stakes designated 34 and 35 having grooves 36 wherein the bars of a gate member 37 comprising hinged halves 38 and 39 are slidably retained, one of said halves being hinged to the adjacent end gate section 32.

Incidental features for stabilizing structure and providing accessory conveniences may be installed including the chute-supporting rack or bar 40 trussing the sills at the rear end of the body, on which a pipe 41 is sleeved.

Assuming the vehicle equipped with a body embodying my invention, it is apparent that the stakes are slidably but rigidly supported in the grooves of the ribbon boards and joists by the rigid band and the complementary joists, whereby racking, loosening and displacement of the stakes due to relatively fragile nature of the stake-retaining straps ordinarily provided are prevented.

The side members of the body in whatever number provided to suit possible demands for various sizes and positions of side gates, are relatively stable and securely connected by the angles and fastening bolts illustrated, and any gate section of the side member can easily be released from fixed engagement and moved slidingly to provide an opening, or may be entirely removed.

The side and end members of the body may be securely and rigidly attached at their meeting corners by means that can be tensioned for mounting a body; and that can be disengaged quickly for removal of the stake structure or any sections thereof. The rear end elements provide a gate structure having multiple uses; for example, the gate may be swung open, or the hinged gate may be raised from its hinges and slid in the grooves of the adjacent sections.

What I claim and desire to secure by Letters Patent is:

1. In a truck body including a platform having spaced pockets, a rack section including a stake receivable in one of said pockets and a series of vertically spaced horizontal slats fixed to the stakes and having registering free ends projecting beyond the stake, an angle iron including a leg fixed to the outer faces of said slats and having a free edge registering with the registering end faces of said ends of the slats, and an apertured leg projecting outwardly from the slats, a second rack section including a stake receivable in another of said pockets and having a longitudinal groove in the inner edge thereof, and a series of vertically spaced slats fixed to the inner face of the stake and having registering vertical end faces registering with one wall of said groove and spaced from the vertical free edge of the stake to abut the end faces of the slats of the first named rack section, a vertical plate fixed to the inner faces of the slats and having an edge portion projecting beyond said end faces of the slats, and a fastener having a portion engaged with said grooved stake and a portion engageable in the aperture of said projecting angle iron leg for retaining the slats of the second named rack section in end abutting relation with the slats of the first named rack section.

2. In a truck body including a platform having pockets arranged to receive stakes of aligned rack sections, a pair of rack sections, each comprising vertical stakes mounted in said pockets and a series of vertically spaced horizontal slats fixed to the stakes, the ends of the slats of one of said series abutting the ends of the slats of the adjacent aligned section, an apertured stake fixed to the outer faces of one of said series of slats at the ends thereof and including a portion extending beyond the ends of said slats, a longitudinal vertical groove in said stake having a wall registering with the vertical end faces of the slats of the series to which said grooved stake is attached, a vertical plate fixed to the inner faces of said slats and having a longitudinal edge portion projecting beyond the ends of the slats to cooperate with said groove and the slats to form sockets to receive the ends of the other of said series of slats, a vertically arranged angle iron having an apertured leg and a leg fixed to the outer faces of the second named series of slats in face to face relation therewith and a vertical edge registering with the end faces of said slats, a bolt mounted in the apertures of the grooved stake and angle iron leg, and a nut threadable on said bolt to draw the ends of the second named series of slats into said sockets and retain the two series of slats in end-abutting relation.

In testimony whereof I affix my signature.

MYLES STANDISH.